Sept. 19, 1967 HANS-ULRICH KNAUER ET AL 3,342,948

FREQUENCY MODULATED TELEPHONE RINGING SYSTEM

Filed March 24, 1964

United States Patent Office 3,342,948

Patented Sept. 19, 1967

3,342,948

FREQUENCY MODULATED TELEPHONE RINGING SYSTEM

Hans-Ulrich Knauer and Armin Konold, Kornwestheim, Wurttemberg, Germany, assignors to International Standard Electric Corporation, New York, N.Y., a corporation of Delaware Filed Mar. 24, 1964, Ser. No. 354,326
Claims priority, application Germany, Apr. 10, 1963, St 20,496
6 Claims. (Cl. 179—84)

ABSTRACT OF THE DISCLOSURE

This invention relates to means for generating ringing current in a telephone system. It especially relates to means for generating ringing current having a frequency variation which matches the deviation in the resonant frequencies of ringers in a plurality of production line subscriber stations. Such matching is desirable in order to maximize the volume of sound produced by the ringers in environments in which power is limited to ringing current levels. An exemplary signal generator uses a multivibrator operating at a frequency of 8 Hertz (where the deviation in resonant frequencies is 16 Hertz), integrates the 8 Hertz signal to provide triangular waves, and uses the triangular waves to frequency modulate the signals generated by a second multivibrator. As a result, the second multivibrator provides ringing current having a frequency deviation, centered around the point of resonance of an optimum ringer, just matching the deviation in resonance of a plurality of production-run ringers.

This invention relates in general to telephone ringing systems and in particular to ringing systems in which the ringing signals are frequency modulated.

In many telephone systems, such as electronic systems and underground mine systems, for example, the ringing current supplied to the subscriber station must be of a low amplitude voltage. Accordingly, known systems have been devised which use low voltage voice-frequency tone signals. However, one disadvantage of tone signalling is that insufficient sound intensity is generated at the subscriber station, especially in noisy environments. Amplifiers cannot be satisfactorily used without an increase in the supply current to the substation.

It is therefore an object of this invention to provide a signalling system which will provide a high intensity audible signal from a low voltage ringing signal input.

According to the present invention, the foregoing object is accomplished by providing a resonator forming a part of an unattenuated ringing system which system is in resonance with the ringing signals and which utilizes a frequency modulated ringing signal whose deviation encompasses the tolerance range of the resonant frequency of the ringing system.

In known systems, ringing systems and resonators have been utilized. However, these known systems provided some form of attenuation in order to compensate for production deviations. According to the present invention, the ringing system is unattenuated and has a distinct resonance which is tuned to the ringing frequency in order to obtain acoustical signals of maximum amplitude.

Ringing systems with a distinct resonance exhibit considerable dispersion from the resonance frequency and in order to obtain minimum loss of the ringing signal, which is also subject to frequency deviations, a frequency modulated ringing signal is used which continuously changes over the entire dispersion range of the ringing system. This provides the advantage that the duration of the ringing signal in the resonant range of the ringing system is relatively independent of the deviation in production of the ringing system as regards the resonant frequency. Therefore, maximum acoustical intensity is obtained with relatively small ringing power.

The ringing system according to the present invention will become apparent and the invention will be best understood when the specification and claims are read in conjunction with the accompanying drawings, comprising FIGS. 1 to 3 wherein:

Figure 1:
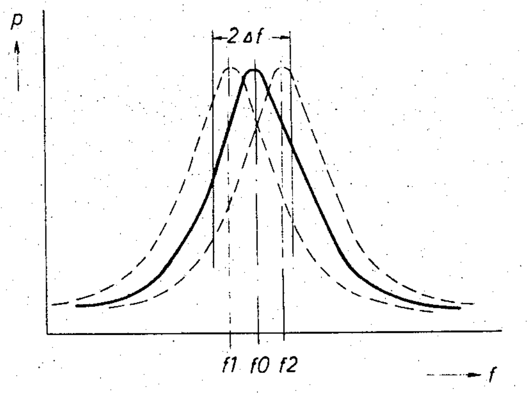
FIG. 1 shows resonance curves for various electro-acoustical devices.

As shown in FIG. 1, normal production tolerances result in electro-acoustical devices having resonance frequencies illustrated as $f1$, $f0$, $f2$ with $f0$ being the selected resonant frequency of an optimum device. The chart in FIG. 1 characterizes frequency $f$ versus pressure $p$. The devices with the resonant frequencies $f1$ and $f2$ present the more undesirable devices. The frequency duration, indicated as $2\Delta f$, which must be selected for the ringing frequency thus extends beyond the frequencies $f1$ and $f2$.

In order for the ringing signal to have a long duration in the resonant range, a frequency modulated signal is provided which has a duration $2\Delta f$ through which it passes in both directions during the same period.

Figure 2:
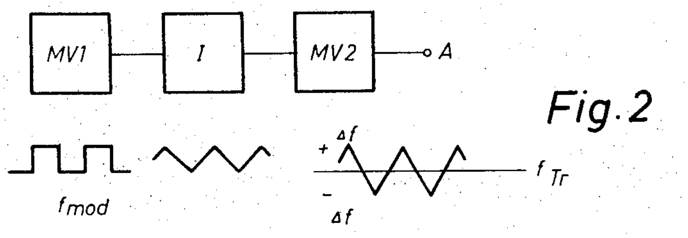
FIG. 2 shows a block diagram of the ringing signal frequency generator of the present invention.

As illustrated in FIG. 2, the ringing signal is produced by two multivibrators MV1 and MV2 interconnected by an integrator I. The multivibrator MV2, tuned to the ringing frequency $ftr$, is an unstable multivibrator which has its pulse-sequence frequency continuously modified.

Figure 3:
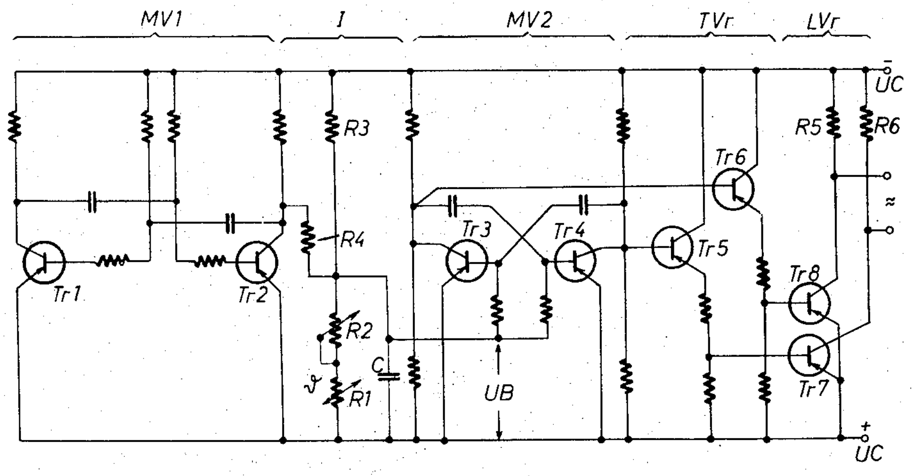
FIG. 3 shows a circuit diagram of an exemplary generator together with a buffer amplifier and power amplifier.

The well-known multivibrator MV1, shown in circuit detail in FIG. 3, is adjusted to oscillate at a frequency of 8 c.p.s., for example, to generate the rectangular pulses $f_{mod}$ shown in FIG. 2 which determines the period of the ringing signal. The well-known integrator I, shown in circuit detail in FIG. 3, converts the rectangular pulses to triangular voltage pulses having a continuously rising and continuously dropping edge. These triangular pulses are fed to the multivibrator MV2 shown in circuit detail in FIG. 3 by tapping off the voltage UB across capacitor C.

Since the magnitude of the voltage UB directly influences the pulse sequence frequency of multivibrator MV2, a ringing signal is obtained having a frequency $fTr \pm \Delta f$.

As shown in FIG. 3, a well-known buffer amplifier TV$r$ is provided which feeds the noted ringing signal to a well-known power amplifier LV$r$. Thus permits a large number of lines to be signalled simultaneously without adversely influencing the characteristic shape of the ringing signal.

The resistors R1 and R2 of the integrator I permit the deviation of the multivibrator to be set independently of temperature fluctuations.

Any ringing system having a distinct resonance can be followed by a resonator and sound-radiation funnels designed to obtain the maximum sound intensity at the resonance point.

While we have described our invention in conjunction with specific apparatus and applications, it is to be understood that this description is made only by way of example and not as a limitation on the scope of the invention.

What is claimed is:

1. A signalling arrangement for telephone systems comprising in combination first means for generating first signals of a predetermined frequency selected to be equal in frequency to the deviation desired in the frequency of a ringing signal, second means for generating second signals of a predetermined frequency, means for integrating said first signals to provide modulating signals proportional to said deviation, and means for applying said modulating signals to the second means to thereby provide the desired frequency variation in said second signals.

2. A signalling arrangement as set forth in claim 1 wherein said first means include a first multivibrator having a low frequency output, said second means include a second multivibrator having an output of a higher frequency, and said integrating means responds to said low frequency output to continuously vary the frequency of said second multivibrator output.

3. A signalling arrangement as set forth in claim 2 wherein the said frequency variations in said second multivibrator output are made equal to incremental frequency variations expected to be encountered in user equipment.

4. A signalling arrangement as set forth in claim 2 wherein the second multivibrator output has a low ohmic resistance.

5. An arrangement as claimed in claim 4, in which the output of the second multivibrator includes two switching stages connecting into two low and purely ohmic resistances.

6. An arrangement as claimed in claim 1, in which the integrating circuit consists of an RC circuit.

References Cited

UNITED STATES PATENTS

| | | | |
|---|---|---|---|
| 2,338,395 | 1/1944 | Bartelink | 332—14 |
| 2,432,204 | 12/1947 | Miller | 332—14 |
| 3,061,783 | 10/1962 | Noller | 179—84 |
| 3,210,479 | 10/1965 | Engelachall | 179—84 |
| 3,240,879 | 3/1966 | Byrant | 179—41 |

KATHLEEN H. CLAFFY, *Primary Examiner.*

H. ZELLER, *Assistant Examiner.*